United States Patent [19]

Toner et al.

[11] Patent Number: 4,818,179
[45] Date of Patent: Apr. 4, 1989

[54] COMPOSITE HELICOPTER ROTOR HUB

[75] Inventors: Thomas J. Toner, Milford; Leonard J. Doolin, Southbury, both of Conn.

[73] Assignee: United Technologies Corporation, Hartford, Conn.

[21] Appl. No.: 80,368

[22] Filed: Jul. 30, 1987

[51] Int. Cl.⁴ .............................................. B64C 11/06
[52] U.S. Cl. ............................... 416/134 A; 416/230; 416/244 R
[58] Field of Search ............... 416/134 A, 230 A, 114, 416/244 D

[56] References Cited

U.S. PATENT DOCUMENTS

| | | | |
|---|---|---|---|
| 4,156,583 | 5/1979 | Mayerjak | 416/208 |
| 4,321,013 | 3/1982 | Schwarz et al. | 416/241 A X |
| 4,425,082 | 1/1984 | Mussi et al. | 416/134 A X |
| 4,466,774 | 8/1984 | Cycon et al. | 416/134 A |
| 4,483,214 | 11/1984 | Mayer | 416/134 A X |
| 4,512,717 | 4/1985 | Pancotti et al. | 416/134 A |
| 4,516,909 | 5/1985 | Caramaschi et al. | 416/134 A |
| 4,521,157 | 6/1985 | Caramaschi et al. | 416/134 A |
| 4,543,040 | 9/1985 | McArdle et al. | 416/134 A |
| 4,556,365 | 12/1985 | Mouille et al. | 416/230 A |
| 4,568,245 | 2/1986 | Hibyan et al. | 416/134 A |

Primary Examiner—Everette A. Powell, Jr.

[57] ABSTRACT

A helicopter rotor hub including a main retention plate that comprises triaxial braided tubular composite material having a fiber orientation that withstands forces both in the plane and normal to the plane of the retention plate. The retension plate comprises a plurality of fiber reinforced resin braided tubular rings that are spaced about in a plane normal to a central axis. The rings form a circumferential ring structure having arm means extending inwardly. A flattened braided tubular ring strap surrounds the circumferential ring structure. Fiber reinforced plates are disposed above and below the ring structure providing additional in-plane strength. The braided tubular rings and braided tubular ring strap comprises substantially circumferential fibers interwoven with angled fibers oriented at a predetermined angle to the circumferential fibers.

4 Claims, 1 Drawing Sheet

COMPOSITE HELICOPTER ROTOR HUB

TECHNICAL FIELD

The field of art to which this invention pertains is helicopter rotor hubs and particularly rotor hubs comprising fiber reinforced epoxy matrix composite.

BACKGROUND ART

Historically, helicopter main rotor hubs have been made of high strength, lightweight, critical metals or alloys. Although these metal components have performed adequately, there are a number of drawbacks inherent to these materials. Three important areas where these materials possess less than optimum features are weight, availability and damage tolerance.

Weight has always been a consideration in helicopter construction and with increasing fuel costs it has become a primary objective to reduce the weight of the overall helicopter by using lighter materials. At present aluminum and titanium are used extensively because of their light weight and strength, however, there is a constant search for lighter and stronger materials. In addition, many of these lightweight metals are classified as "critical" materials with their primary availability being through importation. As has been demonstrated by the oil embargoes of past years, reliance on foreign sources for these materials is not desirable. Furthermore, these metals do not impart a damage tolerance to their components. That is, when a metal component starts to weaken, through fatigue or otherwise, cracks are generated. These cracks continue to grow quickly as there is nothing to stop their propagation and the component part can fail completely. As can be appreciated, this lack of damage tolerance can be disastrous in a helicopter.

In order to overcome the shortcomings of such metal components, the industry has taken two approaches. One is to build a redundant component so that should one fail, the other will allow for safe landing. The second is to overdesign the particular part such that it would have much greater strength than would normally be required under normal circumstances. Both of these approaches add weight to the aircraft as well as increased cost and reliance on critical metals.

Recently, composite materials have been used as replacement parts for many metal components due to their light weight and relatively low cost. For example, composite materials are now being used in main structural components such as main rotor blades and tail rotor assemblies on helicopters. However, it is not always practical to replace a metal component with a composite material due to particular design considerations and shortcomings in the composite physical properties.

Composite rotor hubs have been designed using a laminated structure of fiber reinforced resin e.g., note British Patent No. 2,092,541. Such hubs are of such complicated design as to make them costly to fabricate, and having more component parts, produce an increased number of failure points.

Accordingly, what is needed in this art are damage tolerant, relatively inexpensive and lightweight composite components capable of withstanding the forces developed in a helicopter rotor hub assembly.

DISCLOSURE OF INVENTION

This invention is directed to a helicopter rotor hub including a main retention plate that comprises triaxial braided tubular composite material having a fiber orientation that withstands forces both in the plane and normal to the plane of the retention plate. The retention plate comprises a plurality of fiber reinforced resin braided tubular rings that are spaced about in a plane normal to a central axis. The rings form a circumferential ring structure having arm means extending inwardly. A flattened braided tubular ring strap surrounds the circumferential ring structure. Fiber reinforced plates are disposed above and below the ring structure providing additional in-plane strength. The braided tubular rings and braided tubular ring strap comprises substantially circumferential fibers interwoven with angled fibers oriented at a predetermined angle to the circumferential fibers.

This rotor hub withstands flapwise shear forces that can delaminate conventional composite laminates. Thus, it makes a significant advance in the field of composite rotor hubs.

The foregoing and other objects, features and advantages will be apparent from the specification, claims and from the accompanying drawings which will illustrate an embodiment of the invention.

BEST MODE FOR CARRYING OUT THE INVENTION

Typically, graphite fiber is used as the reinforcement. A high strength graphite fiber may be used which has a minimum filament modulus of $30 \times 10^6$ psi. The individual fibers are generally about 0.35 to about 0.399 mil in diameter. The graphite fiber may be purchased from, for example, Hercules, Inc. (Wilmington, Delaware) in dry roving form. It is preferred that the cured graphite/resin composite should contain about 55% to about 60% fibers by volume. Although percentages as high as 65% and as low as 50% may be tolerated without severe strength degradation.

Preferably, a resin such as epoxy should be selected so as to be compatible with the fiber reinforcement. It is also desirable that the resin be satisfactorily curable at low pressures (i.e., about 20 to about 100 psig). One such resin system, Dow Tactax 123 ™ Resin and Dow Tactax ™ H41 hardener, is available from Dow Industries.

Triaxial braided tubular composite is critical to this invention. Triaxial interwoven braided fibers result in an integral component that have no highly loaded bond lines such as are present in conventional laminate composites (e.g., commonly assigned U.S. Pat. No. 4,568,245). Thus, primary loads resulting from centrifugal forces and shear forces due to lift are reacted by the fibers in the ring and not by the resin matrix. Triaxial braided tubular composite has been available, for example, from Fiber Innovations, Inc. (Norwood, Massachusetts). Alternatively, a continuous ring braider may be modified to form a split bed braider suitable for braiding continuous tubular rings. A continuous ring braider such as that available from the New England Butt Division of Wardwell Braiding Machine Company (Central Falls, Rhode Island) is cut across a diameter to form two half-rings. The two half-rings are attached with a hinge (to reform the ring) so that the bed may be opened to allow removal of the braided ring from the bed. A locking mechanism is provided to keep the half-rings joined together during operation.

Figure 1:
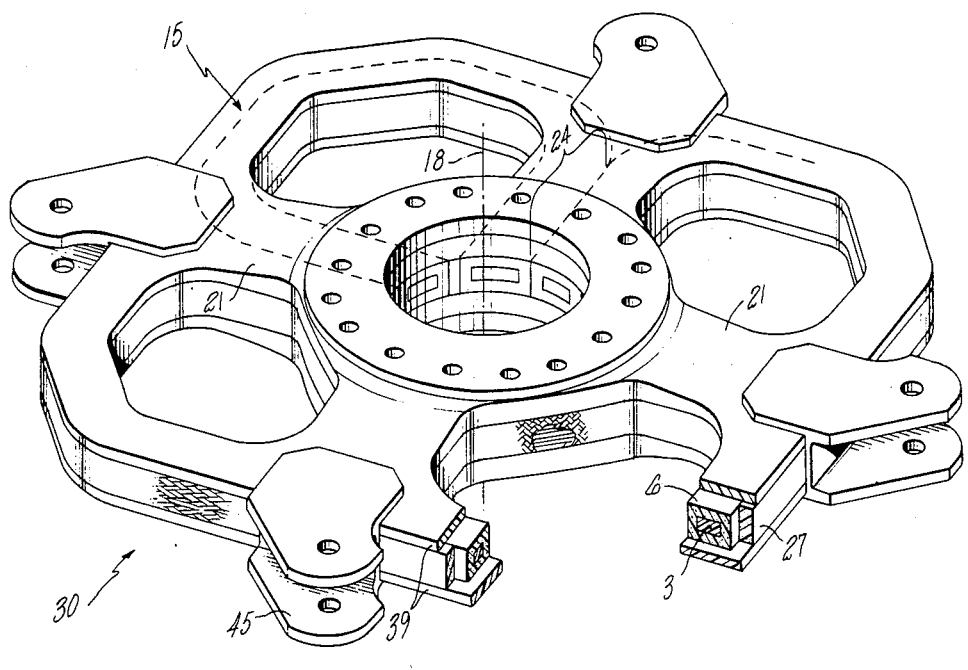
FIG. 1 is a perspective view cutaway of the composite rotor hub of this invention.

According to FIG. 1, a nonstructural flyaway material (e.g., chopped fiberglass reinforced epoxy) is used as the mandrel 3 for the braided tubular rings 6. The braided rings 6 preferably have a substantially rectangular cross-section because that provides increased surface area for bonding between the parts described below (e.g., between adjacent rings, between the rings and the circumferential strap and between the rings and the upper and lower plates). In addition, it is preferred that the rings are substantially circular (e.g., do not have corners). Corners can be difficult to braid and can result in bunching of fibers whereas curved rings result in a constant fiber resin ratio throughout a cross-section.

Figure 2:
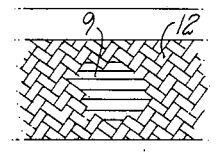
FIG. 2 illustrates the triaxial braided fibers of the braided tubular rings.

The braided tubular rings 6 that surround the mandrel 3 have a triaxial braid comprising (as depicted in FIG. 2) circumferential fibers 9 interwoven with angled fibers 12 oriented at about ±30° to about ±60° with respect to the circumferential fibers 9. The circumferential fibers 9 are preferably coplanar with the braided ring 6, however, minor deviations from 0° (e.g., +5°) can be tolerated. Above about 10° off axis the circumferential fibers have a reduced capability to withstand the centrifugal forces that the rentention pate is subject to, resulting in a degradation in strength. Below about 30° and above about 60°, the angled fibers 12 are not able to withstand the transverse shear forces (e.g., caused by lift as a tensile load) that can cause delamination. For example, it was found that conventional composite laminate retention plates can delaminate when subjected to bending fatigue testing.

A plurality, preferably four, of the braided tubular rings 6 are substantially evenly spaced about in a plane normal to a central axis 18 to form the circumferential ring structure 15. The circumferential ring structure 15 has arm means 21 for attaching the circumferential ring structure 15 to a helicopter driveshaft that is coexistent with the central axis 18. The arm means 21 extends inwardly from said circumferential ring structure and substantially towards the central axis 18 and each arm may be formed by two sections 24 of contiguous braided rings. Typically, the arms 21 are through bolt connected to a flange which is attached to the driveshaft. A pressure plate clamps the hub to the flange.

Figure 3:
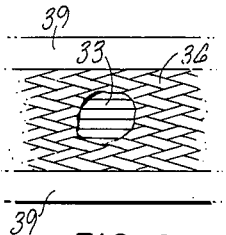
FIG. 3 illustrates the triaxial braided fibers of the circumferential strap.

A circumferential composite strap 27 is disposed about the periphery of and parallel (coplanar) with the circumferential ring structure 15 providing an additional continuous load path for in-plane loads (e.g., centrifugal). This forms a strapped circumferential ring structure 30. Preferably the composite strap 27 comprises a triaxially braided tube that is flattened (e.g., collapsed) to form a strap. According to FIG. 3, the strap 27 comprises circumferential strap fibers 33 running substantially coplanar with the circumferential ring structure 15 (e.g., 0°±5°) interwoven with angled strap fibers 36 oriented at an angle of about ±15° with respect to the circumferential strap fibers 33. Outside of these angles tensile strength is greatly reduced. The angled strap fibers provide resistance to resin cracks without greatly compromising tensile strength. The composite strap 27 joins the tubular braided rings 6 together to withstand in-plane loads while providing a redundant continuous load path for centrifugal forces. The strap 27 is preferably made by braiding a triaxial tube with angle fibers at ±15°. The size of the tube mandrel would be selected such that the diameter of the tube, when flattened, would correspond to the required width of the strap.

Two composite plates 39 are disposed above and below and substantially parallel to said strapped circumferential ring structure 30. The composite plates 39 are typically laminates having, for example, 0/±45/90 fiber orientation. The laminated plates 39 reinforce the braided plate hub at the shaft, help tie the braded rings 6 together along contiguous sections 24 and aid in withstanding in-plane shear loads. It is preferable that they are situated away from the center of the retention plate because the transverse shear stresses are lower away from the center thereby avoiding possible delamination. The plates 39 may include fastening means such as lugs 45 for attachment to a damper.

The plates 39 are preferably made by laying up fiber in the desired orientations to a suitable thickness and cutting the laminate to size. The laminates are assembled with the circumferential strapped ring structure in a suitable resin transfer mold and the entire assembly is impregnated with resin in a conventional transfer molding apparatus and processed at temperatures, pressures and times suitable for the particular resin used.

The strapped circumferential ring structure 30 and plates 39 form a composite main rotor head braided plate hub that may be attached to the helicopter blades by a conventional yoke/torque tube/pitch horn and damper assembly.

This braided composite rotor hub withstands both forces in-plane and normal to said plane. Importantly, it withstands flapwise shear forces that can delaminate conventional composite laminates. It is a lightweight hub that provides a low frontal area. Also, the hub has multiple and redundant load paths which improve damage and ballistic tolerance. Finally, the triaxial braided composite material has improved fail safety as a result o slow crack propagation time.

Although the invention has been shown and described with respect to detailed embodiments, it should be understood by those skilled in the art that various changes and omissions in form and detail may be made therein without departing from the spirit and scope of the invention.

We claim:

1. A helicopter rotor hub including a main retention plate comprising:
   (a) a plurality of fiber reinforced resin triaxial braided tubular rings said rings being substantially evenly spaced about in a plane normal to a central axis; said rings forming a circumferential ring structure having an outer periphery and arm means for attaching said circumferential ring structure to a driveshaft; said arm means extending inwardly from said circumferential ring structure;
   (b) a circumferential fiber reinforced resin triaxial braided strap disposed about the periphery of and substantially coplanar with said circumferential ring structure forming a strapped circumferential ring structure;
   (c) said strapped circumferential ring structure having upper and lower fiber reinforced plates disposed above and below and substantially parallel to said ring structure;

(d) said triaxial braided tubular rings having substantially circumferential fibers interwoven with angled fibers oriented at a predetermined angle to said circumferential fibers; said circumferential and angled fibers disposed about a central core; and (e) said circumferential triaxial braided strap comprising a flattened braided tubular ring having substantially circumferential strap fibers and angle strap fibers oriented at a predetermined angle to said circumferential strap fibers;

wherein said fiber orientation withstands forces both in the plane of said retention plate and normal to said retention plate.

2. The main helicopter rotor hub as recited in claim 1 wherein said fibers are oriented at an angle of about 30° to about 60° with respect to said substantially circumferential fibers.

3. The main helicopter rotor hub as recited in claim 1 wherein said angle strap fibers are ±15°.

4. The main helicopter rotor hub as recited in claim 1 wherein said fiber reinforced resin plates comprise fibers oriented in planes normal to said central axis that are capable of having in-plane isotropic material properties.

* * * * *